(12) United States Patent
Larson et al.

(10) Patent No.: US 7,233,321 B1
(45) Date of Patent: Jun. 19, 2007

(54) POINTING DEVICE WITH INTEGRATED AUDIO INPUT

(75) Inventors: Jim A. Larson, Beaverton, OR (US); Ben S. Wymore, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/211,942

(22) Filed: Dec. 15, 1998

(51) Int. Cl.
*G09G 5/00* (2006.01)
(52) U.S. Cl. ................................. 345/179; 345/156
(58) Field of Classification Search ............... 345/173, 345/177, 179, 156; 179/18, 19; 705/2, 3; 707/10, 104; 343/702; 455/11.1, 556, 557, 455/414; 434/350; 704/246; 178/18.01, 178/19.01
See application file for complete search history.

(56) References Cited

U.S. PATENT DOCUMENTS

| | | | |
|---|---|---|---|
| 3,376,551 A * | 4/1968 | Armburster ................. 345/179 |
| 4,814,552 A * | 3/1989 | Stefik et al. .................. 178/18 |
| 5,237,647 A | 8/1993 | Roberts et al. ............. 395/119 |
| 5,247,137 A * | 9/1993 | Epperson ..................... 178/18 |
| 5,367,454 A | 11/1994 | Kawamoto et al. ...... 364/419.2 |
| 5,420,607 A | 5/1995 | Miller et al. ................ 345/156 |
| 5,404,442 A | 4/1996 | Foster et al. ................ 395/159 |
| 5,513,309 A | 4/1996 | Meier et al. ................ 395/155 |
| 5,526,023 A * | 6/1996 | Sugimoto et al. ........... 345/179 |
| 5,561,446 A * | 10/1996 | Montlick ..................... 345/173 |
| 5,581,783 A * | 12/1996 | Ohashi ....................... 395/825 |
| 5,606,594 A * | 2/1997 | Register et al. .......... 455/556.2 |
| 5,606,674 A | 2/1997 | Root ........................... 395/346 |
| 5,627,348 A * | 5/1997 | Berkson et al. ............. 345/179 |
| 5,635,682 A | 6/1997 | Cherdak et al. .............. 128/18 |
| 5,721,852 A | 2/1998 | Porter ........................ 395/349 |
| 5,724,410 A * | 3/1998 | Parvulescu et al. ...... 379/88.18 |
| 5,769,643 A * | 6/1998 | Stevens, III ................ 434/350 |
| 5,778,404 A | 7/1998 | Capps et al. ................ 715/531 |
| 5,818,425 A | 10/1998 | Want et al. ................. 345/158 |
| 5,825,921 A | 10/1998 | Dulong ....................... 382/181 |
| 5,850,058 A * | 12/1998 | Tano et al. ............. 178/18.01 |
| 5,867,821 A * | 2/1999 | Ballantyne et al. ............ 705/2 |
| 5,894,595 A * | 4/1999 | Foladare et al. ............ 455/414 |

(Continued)

FOREIGN PATENT DOCUMENTS

EP       0 622 724 A2 * 11/1994

(Continued)

*Primary Examiner*—Ricardo Osorio
(74) *Attorney, Agent, or Firm*—Schwegman, Lundberg, Woessner & Kluth, P.A.

(57) ABSTRACT

A mobile personal digital assistant (PDA) allows a user to enter information using both a touch screen and voice commands with a stylus. The stylus includes a microphone positioned at one end, and a transmitter for transmitting received voice signals to either a personal computer (PC) or the PDA. In one embodiment, a wireless stylus also includes a power supply and an activation control switch. The PC is used to translate the voice signals into translated voice data which is transmitted to the PDA for storage and display. If the user and the PDA are located remotely from the receiving PC, voice signals are stored in the PDA until a later time when the PC can translate the received voice signals. Where the PDA contains a processor to translate received voice signals, the stylus transmits directly to the PDA, and the PDA translates the received voice signals.

7 Claims, 4 Drawing Sheets

U.S. PATENT DOCUMENTS

| | | | |
|---|---|---|---|
| 5,914,708 A * | 6/1999 | La Grange et al. | 345/179 |
| 5,917,493 A | 6/1999 | Tan et al. | 345/358 |
| 5,978,452 A * | 11/1999 | Cho | 379/88.24 |
| 5,983,073 A * | 11/1999 | Ditzik | 455/11.1 |
| 6,003,774 A | 12/1999 | Bard et al. | 235/462.45 |
| 6,061,052 A | 5/2000 | Raviv et al. | 345/180 |
| 6,111,565 A | 8/2000 | Chery et al. | |
| 6,112,174 A * | 8/2000 | Wakisaka et al. | 704/251 |
| 6,118,437 A | 9/2000 | Fleck et al. | |
| 6,195,446 B1 | 2/2001 | Skoog | 382/119 |
| 6,218,964 B1 * | 4/2001 | Ellis | 340/990 |
| 6,238,217 B1 | 5/2001 | Mirando et al. | 434/365 |
| 6,243,071 B1 | 6/2001 | Shwarts et al. | 345/146 |
| 6,243,092 B1 | 6/2001 | Okita et al. | 345/349 |
| 6,246,895 B1 | 6/2001 | Plewes | 600/410 |
| 6,262,684 B1 * | 7/2001 | Stewart et al. | 343/702 |
| 6,289,464 B1 * | 9/2001 | Wecker et al. | 713/300 |
| 6,295,372 B1 | 9/2001 | Hawkins et al. | 382/187 |
| 6,297,830 B1 | 10/2001 | Hoddie et al. | 345/473 |
| 6,337,914 B1 * | 1/2002 | Phillipps | 381/87 |
| 6,362,440 B1 | 3/2002 | Karidis et al. | |
| 6,396,481 B1 | 5/2002 | Challa et al. | 345/169 |
| 6,429,846 B2 | 8/2002 | Rosenberg et al. | |
| 6,621,697 B2 | 9/2003 | O'Hara et al. | 347/100 |
| 6,633,282 B1 | 10/2003 | Monroe | 430/303 |
| 2004/0046744 A1 | 3/2004 | Rafii et al. | |
| 2004/0143689 A1 | 7/2004 | Leavitt | |

FOREIGN PATENT DOCUMENTS

| | | |
|---|---|---|
| JP | 404113449 A * | 4/1992 |
| JP | 06131108 A * | 5/1994 |
| JP | 410093671 A * | 10/1998 |

* cited by examiner

POINTING DEVICE WITH INTEGRATED AUDIO INPUT

TECHNICAL FIELD

Embodiments of the present invention relate generally to input devices and, in particular, to pointer type input devices used with touch sensitive processing devices.

BACKGROUND INFORMATION

Advancements in processing power have enabled the design and manufacture of processing devices which deviate from a traditional input device such as a keyboard. For example, hardware and software have been developed which allow a user to control a computer using normal speech. The user is also capable of dictating information to be stored in memory provided with the computer. Presently, however, accurate speech input must be provided to allow the processor to accurately translate the speech into computer readable data. As such, it is desired to locate a microphone close to the user such that background noise is minimized. Present systems, therefore, require that the user wear a headset to position the microphone close to the user's mouth. The processing power required to perform speech recognition, combined with the requirement for high-quality speech input, dictates that a user operate a traditional stationary personal computer.

Mobile personal computing devices, such as lap-top computers and personal digital assistant (PDA) devices, are available with touch screens as input devices. These touch screens allow a user to touch locations on the display screen to indicate desired input. This type of input allows manufacturers to simplify the interface between the user and the processor, while still providing flexibility to adapt to changes in software executed by the processor.

For the reasons stated above, and for other reasons stated below which will become apparent to those skilled in the art upon reading and understanding the present specification, there is a need in the art for a mobile personal computing device which allows a user to enter information using both a touch screen and voice commands.

SUMMARY OF THE INVENTION

A computer input stylus comprising a housing having a first end and an opposite second end, a microphone located at the second end for receiving voice signals, a transmitter located in the housing for transmitting the voice signals received by the microphone to an external device, and a switch circuit for activating the transmitter.

In another embodiment, a personal digital assistant (PDA) system comprises a mobile personal digital having a touch screen display for producing input signals in response to physical contact, and an input stylus. The stylus comprises a housing having a first end and an opposite second end, a microphone located at the second end for receiving voice signals, a transmitter located in the housing for transmitting the voice signals received by the microphone to the mobile personal digital assistant, and a switch circuit for activating the transmitter.

A method of inputting data to a personal digital assistant (PDA) is described in another embodiment. The method comprises receiving input voice signals with a microphone located in a hand-held stylus, transmitting the input voice signals from the hand-held stylus to the personal digital assistant, and translating the received input voice signals into computer readable data and storing the computer readable data in the personal digital assistant.

DETAILED DESCRIPTION

In the following detailed description of embodiments of the invention, reference is made to the accompanying drawings which form a part hereof, and in which is shown by way of illustration, but not of limitation, specific embodiments of the invention. These embodiments are described in sufficient detail to enable those skilled in the art to practice them, and it is to be understood that other embodiments may be utilized and that logical, mechanical and electrical changes may be made without departing from the spirit and scope of the present disclosure. The following detailed description is, therefore, not to be taken in a limiting sense, and the scope of embodiments of the present invention is defined only by the appended claims.

Figure 1:
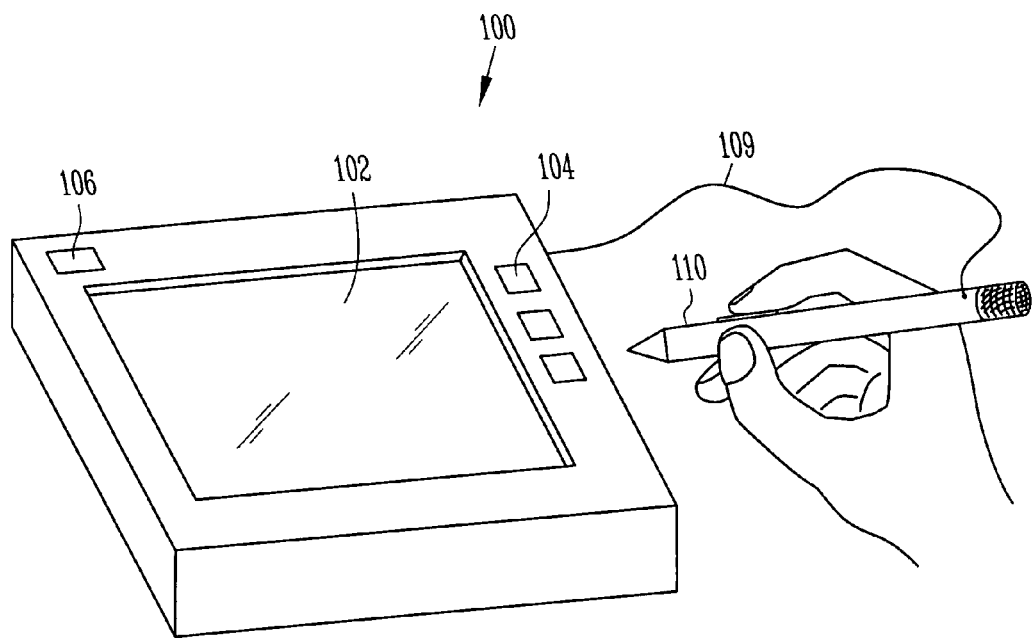
FIG. 1 is illustrates a personal computing device having a touch screen, in accordance with an embodiment of the inventive subject matter.

Referring to FIG. 1, a personal digital assistant (PDA) having a touch screen is described. The PDA 100 is designed to be portable and allow a user to store and recall information. The computing device or PDA 100 includes a touch screen 102, keypad inputs 104, and optional microphone 106. The touch screen 102 can be controlled using a pointing device, or stylus 110. In one embodiment, the stylus 110 includes a microphone 120 receiving acoustical voice commands which are used to input data and/or control the PDA 100. It will be appreciated that the PDA 100 is typically used in a manner which positions the PDA 100 approximately 12 to 18 inches away from a user's mouth. As such, optional microphone 106 is susceptible to background noise. To reduce the effects of background noise, a microphone is provided in the stylus 110 as described in greater detail below. As illustrated in FIG. 1, the stylus 110 can be tethered to the PDA 100 via a wire 109 such that the wire 109 is used for wired communication between stylus 110 and the PDA 100. This wire is optional, such that in another embodiment the stylus communicates via wireless transmissions. In any event, the stylus is in the immediate vicinity of the PDA. The acoustical voice signals (i.e. speech) received by the stylus 110 are typically translated and displayed on the touch screen 102. The translated data is stored in the PDA 100 such that the user can retrieve the information and view the stored data. The term "personal digital assistant" (PDA) is used herein to define any mobile computing device intended to store and communicate information for use by a user. This information is typically personal in nature, such as addresses, notes, schedules and the like. The PDA 100 can include lap top computers with a touch screen. The PDA 100 can also include communication circuitry for bi-directional communication with external devices, such as fax machines, and networked computers. Thus, PDA's are not limited to data storage and display devices.

Figure 2:
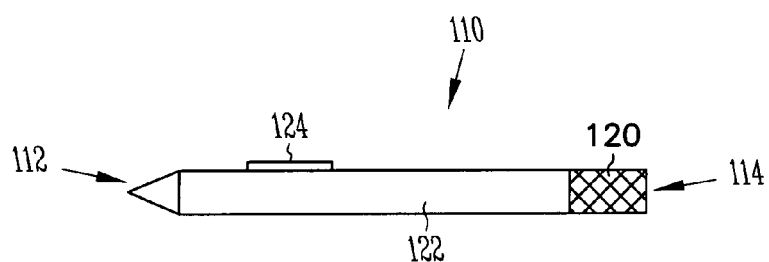
FIG. 2 illustrates a pointing device for use with the personal computing device of FIG. 1.

One embodiment of a pointing stylus is illustrated in FIG. 2. Stylus 110 includes a first end 112 having a point, and an opposite, second end 114 which includes a microphone 120. The stylus 110 is not limited to having a pointed end, and the end can be, but is not limited to, round, flat or bulbous. The stylus 110 includes a housing 122 which houses an electronic transmitter circuit. An activation switch 124 is provided to allow a user to selectively activate the microphone and transmitter circuits. The stylus 110 is intended to be hand-held and used in a manner similar to a pen. The stylus 110, however, is used to selectively contact touch screen 102 of the PDA to provide input. It will be appreciated that the stylus 110 allows a user to position the microphone 120 close to his or her mouth to increase the quality of voice signals, while reducing the effect of background noise.

Figure 3:
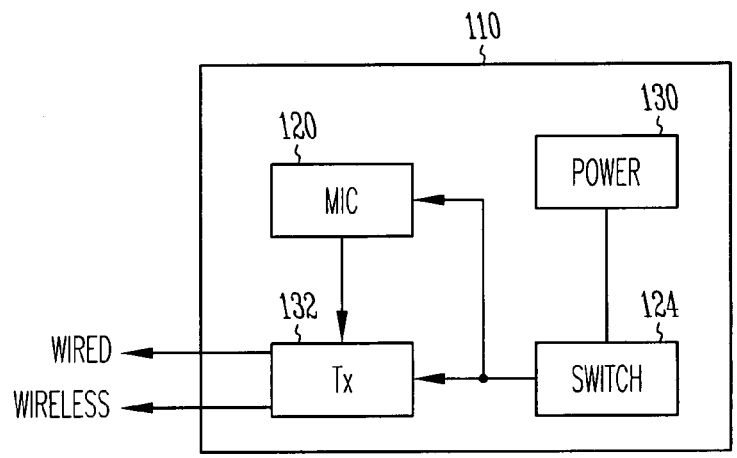
FIG. 3 is a block diagram of circuitry of the pointing device of FIG. 2.

One embodiment of circuitry provided in stylus 110 is illustrated in the block diagram of FIG. 3. The circuitry includes microphone 120, a power source 130, switch 124, and a transmitter circuit 132. The transmitter circuit 132 can be configured to either transmit information to the PDA through a wire, or to transmit voice data via a wireless communications signal. If a wired embodiment is desired, power source 130 can be located in the PDA to reduce circuitry located in the stylus 110. In a wireless embodiment, however, the power source 130 is preferably a battery stored within the housing of the stylus 110. Switch 124 is used to activate the microphone and transmitter circuits 120 and 132, respectively, to allow voice signals to be transmitted to a receiving personal computer (Refer to FIGS. 4 and 5). As such, the switch 124 is typically located along the housing of the stylus 110 such that it is easily activated by a finger of the user. The stylus 110 can be configured to transmit electronic voice signals only while the switch 124 is activated. Alternatively, the stylus 110 can transmit voice signals in response to a single activation of the switch 124. In this embodiment, the transmitter 132 of the stylus 110 ends the transmission when input voice signals are not detected for a predefined time period. In yet another embodiment, the switch 124 is used to both activate the transmitter 132 to start voice signal transmissions, and to deactivate the transmitter 132 to end transmissions of voice signals.

Figure 4:
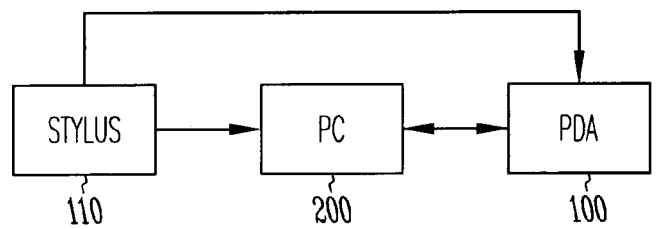
FIG. 4 illustrates one embodiment of a voice processing system, in accordance with the inventive subject matter.
Figure 5:
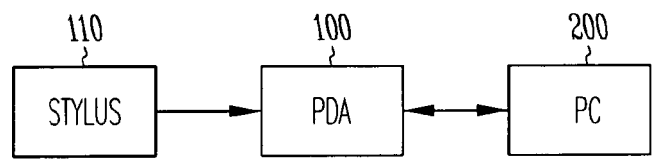
FIG. 5 illustrates another embodiment of a voice processing system, in accordance with the inventive subject matter.
Figure 6:
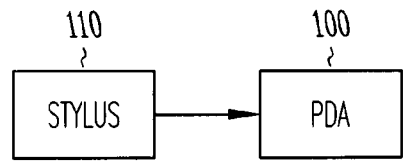
FIG. 6 illustrates another embodiment of a voice processing system, in accordance with the inventive subject matter.
Figure 7:
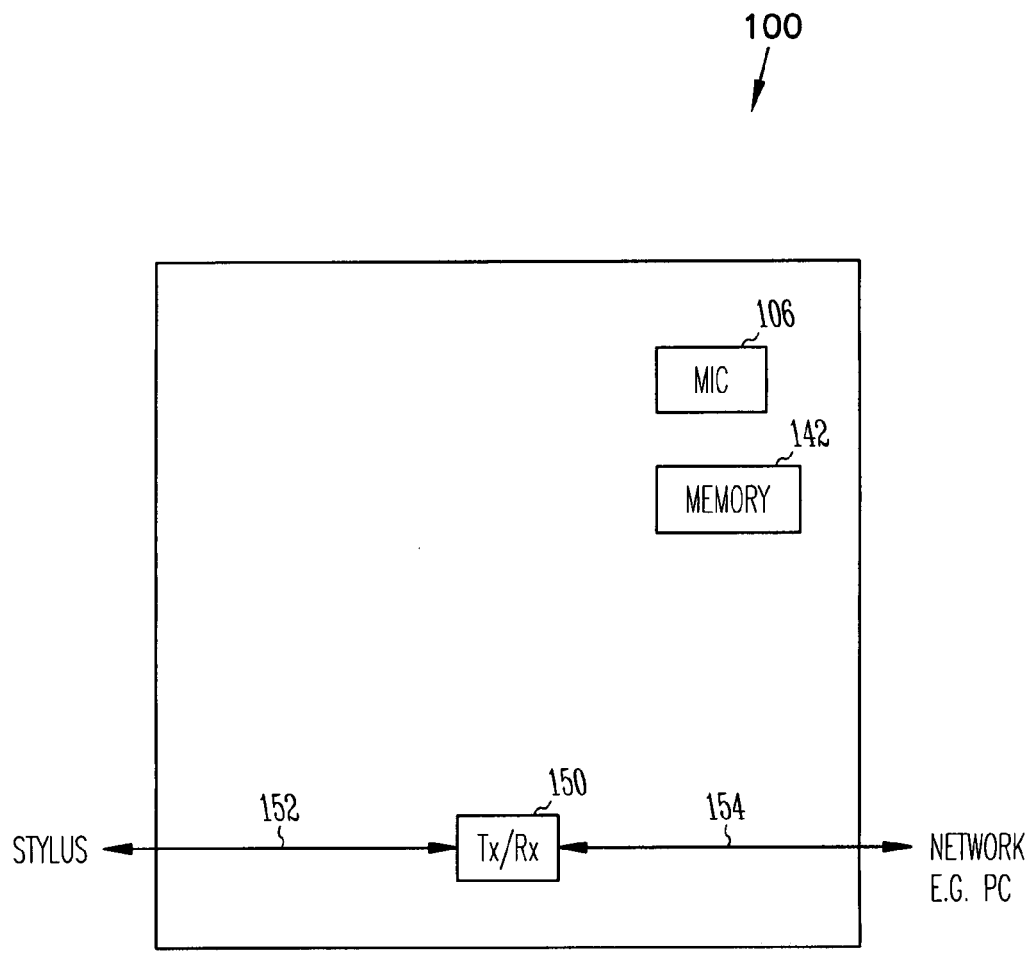
FIG. 7 illustrates a block diagram of an embodiment of a mobile computing device such as a PDA 100. The PDA 100 in this example may comprise a microphone 106, a memory 142, and a transmitter/receiver element (hereinafter "transceiver") 150. Transceiver 150 may be coupled to a stylus via a link 152, which may be either a wired or wireless link. Transceiver 150 may also be coupled via link 154 to a network that may include a FAX machine or PC (such as PC 200, FIGS. 4, 5, and 8).
Figure 8:
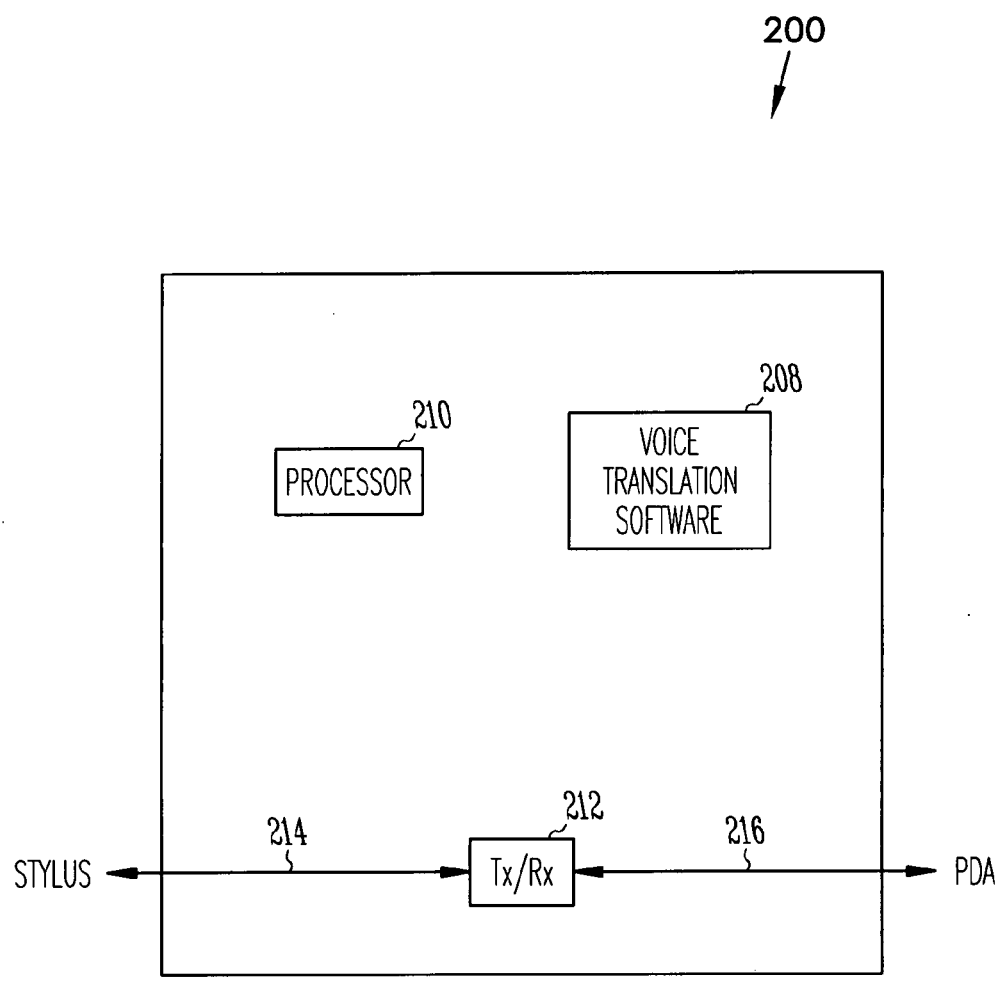
FIG. 8 illustrates a block diagram of an embodiment of a PC 200. PC 200 in this example may comprise a processor 210 and voice translation (alternatively referred to herein as speech recognition) software 208. PC 200 may also comprise a transceiver 212. Transceiver 212 may be coupled to a stylus via link 214, which may be a wireless link. Transceiver 212 may also be coupled via link 216 to a mobile computing device (such as PDA 100, FIGS. 1 and 4-7).

Referring to FIGS. 4-6, different operational embodiments are described of a voice processing system using the above described stylus 110. In a first embodiment, shown in FIG. 4, the stylus 110 communicates electronic voice signals with a PC 200 and directly with PDA 100 via a touch screen. The PC 200 is a home or a business computer intended for stationary use. The PC 200 includes a wireless receiver for receiving wireless transmissions from the stylus 110. Voice signals received by the PC 200 are translated into computer recognizable or readable data. While the voice signals received by the PC 200 can be used by the PC 200 to perform more processing or other operations, it is intended, in an embodiment of the present system, that the PC 200 transmits translated voice information to the PDA 100 via wireless communication. As such, a user operating the PDA 100 activates touch screen 102 using stylus 110 and speaks into the microphone 120. The voice signals are transmitted from the stylus 110 to PC 200 where the voice signals are translated into data. The data is then transmitted from the PC 200 to the PDA 110. It will be appreciated that the physical distance between the user and the PC 200 is limited by the transmission power of the stylus transmitter 132, the PDA 100 and the PC 200. This embodiment allows mobility of the user while maintaining the processing power of the PC 200 for voice recognition.

In another embodiment shown in FIG. 5, stylus 110 transmits voice data to PDA 100. The PDA transmits the received voice data to PC 200. The PC 200 then translates the received voice signals into data, and it transmits the translated data back to the PDA 100. This embodiment allows for a more powerful transmitter to be used between the PC 200 and the PDA 100, than may be available with transmitter 132 (Refer to FIG. 3). In either of the first two embodiments, when the PDA 100 is located geographically away from the PC 200 such that communication between them is not possible, the PDA 100 receives voice data from the stylus 110 and records the voice data for future translation. When the PDA 100 returns to a location where communication with the PC 200 is possible, the recorded voice data is transmitted to the PC 200 for translation, and the translated data is transmitted back to the PDA 100. This option allows a user to voice commands regardless of location relative to the PC 200. If the user retrieves the voice signals prior to translation, the PDA 100 will play the stored signals instead of displaying translated data on the screen.

FIG. 6 illustrates an embodiment where the stylus 110 communicates with the PDA 100, and the PDA 100 performs the speech recognition operations. This embodiment allows the stylus 110 to communicate, in either a wireless or wired manner, with the PDA 100.

A mobile PDA has been described which allows a user to enter information using both a touch screen and voice commands. A stylus has been described which includes a microphone positioned at one end, and a transmitter for transmitting received voice signals to either a PC or the PDA. The wireless stylus also includes a power supply and an activation control switch. The PC can be used to translate the voice signals into computer recognizable data which is transmitted to the PDA for storage and display. If the user and the PDA are located remotely from the receiving PC, voice signals are stored in the PDA until a later time when the PC can translate the received voice signals. This application is intended to cover any adaptations or variations of embodiments of the present invention. For example, the PDA may contain a processor and software sufficient to translate received voice signals such that the PC 200 is not necessary. As such, the stylus transmits directly to the PDA, and the PDA translates received voice signals.

Although specific embodiments have been illustrated and described herein, it will be appreciated by those of ordinary skill in the art that any arrangement which is calculated to achieve the same purpose may be substituted for the specific embodiments shown. Therefore, it is manifestly intended that embodiments of this invention be limited only by the claims and the equivalents thereof.

What is claimed is:

1. A system comprising:
   a stylus comprising:
      a housing having a first end to provide physical contact with a touch screen of a personal digital assistant;
      a microphone to detect speech and to output electronic voice signals; and
      a transmitter located in the housing to transmit the electronic voice signals from the microphone to either a personal computer or the personal digital assistant;
   the personal computer (PC) having a processor, speech recognition software to instruct the processor to translate the electronic voice signals into translated voice data, a wireless receiver to receive the electronic voice signals from the transmitter, and a wireless transmitter to transmit the translated voice data; and
   the personal digital assistant (PDA) having a touch screen display to enter information in response to physical contact and to display the translated voice data, the PDA further comprising a wireless receiver to receive the transmitted translated voice data from the personal computer and to receive electronic voice signals from the stylus.

2. The system of claim 1 wherein the stylus is to transmit the electronic voice signals to the PC via the stylus transmitter, and the PC is to transmit the translated voice data to the PDA via the PC wireless transmitter.

3. The system of claim 1 wherein the stylus is to transmit the electronic voice signals to the PDA via the stylus transmitter, and wherein the PDA and the PC are configured for bi-directional data communication.

4. The system of claim 1 wherein the stylus and the PDA are electrically coupled using at least one wire.

5. The system of claim 1, wherein the microphone is located at a second end of the stylus.

6. The system of claim 1 wherein the stylus further comprises:
   a switch circuit to activate and deactivate the microphone and the transmitter of the stylus.

7. A method comprising:
   detecting speech with a microphone located in a hand-held stylus and outputting electronic voice signals;
   transmitting the electronic voice signals from the hand-held stylus to a personal digital assistant (PDA);
   the PDA receiving the electronic voice signals transmitted from the hand-held stylus;
   the PDA storing the electronic voice signals when the PDA is located geographically away from the PC such that communication between the PDA and the PC is not possible;
   the PDA transmitting the electronic voice signals to the PC when the PDA is located geographically such that communication between the PDA and PC is possible;
   the PC translating the electronic voice signals into translated voice data;
   the PC transmitting the translated voice data to the PDA; and
   the PDA storing the translated voice data.

* * * * *